United States Patent Office 3,042,527
Patented July 3, 1962

3,042,527
PIE WASH
Herbert L. Cantrell, 405 S. 4th, Lamar, Colo.
No Drawing. Filed Aug. 10, 1959, Ser. No. 832,456
3 Claims. (Cl. 99—92)

This invention relates to a method and material for treating pie crusts and more particularly it relates to a composition and the treatment of commercial pie crusts for the large scale production of uniform and acceptable pie crusts.

It is known in commercial baking to moisten pie crusts prior to baking, as by applying a certain amount of water to the exposed surfaces of the crusts to thereby produce a more acceptable product. Commercial bakeries may utilize a plain pastry containing a large amount of shortening or lard, on the order of 50% by weight, which permits mechanical rolling and machine handling of the dough to make the crusts. Such large amounts of shortening, however, tend to toughen the crusts and make them less acceptable to the public. The crusts, commonly known as 50% shortening crust, are greasy after baking both to look and taste.

Included among the objects and advantages of the present invention is a "pie wash" which permits the use of a pastry crust having a substantially reduced amount of shortening, and which produces a baked crust which is not greasy to the taste, is tender having a fine flavor and appearance. The invention provides a treatment for pie crusts which produces crusts which are known in the baking business as "alligator type crusts," i.e. a type of crust which is crinkly and very tender. Further, the treatment of the invention is useful for precooked pies as well as frozen, uncooked pies.

These and other objects and advantages of the invention may be readily ascertained by referring to the following description for the treatment of a particular type of pie crust and one form of "pie wash." A pastry crust which is highly satisfactory for use with a pie wash according to the invention, is made by combining about 12 pounds of flour with about 4 pounds 8 ounces of shortening or pure lard, about 4 ounces of salt and about 8 pounds 8 ounces of water. The ingredients are thoroughly blended, rolled and shaped into pie size and placed in a pan for baking. Such pies with top crusts, of course, are prepared in the normal manner with the lower crust, filling and upper crust.

Pie crusts made of the above formula after being rolled and placed in pie tins are washed with a mixture of the formula given below, and then conveyed to either baking ovens or a freezing treatment, as the case may be. A preferred pie wash, according to the invention, is formed from one pound of whole eggs or egg whites, and 8 ounces of water or milk combined with 8 ounces of corn starch. The wash is prepared by adding the water or milk to the eggs and this combination is subjected to high speed beating until it forms stiff peaks. At that stage the corn starch is added and the mixture is subjected to a slow speed beating or mixing until all the ingredients are thoroughly mixed and blended and so that the mixture maintains a portion of its essentially stiff characteristics. The top crust of the pie is then brushed with this mixture to provide a uniform coating over the pie crust. The amount of ingredients will produce a mixture sufficient to wash about 40 standard size bakery pies.

Pies treated according to the above and immediately baked do not have a greasy taste, and the crust is tender with an attractive crinkly appearance. Pies which are frozen immediately after treatment have crusts which freeze very well and do not run on being baked after remaining frozen for a substantial time. Further, a pie baked after being frozen has an appearance comparable to a freshly made and baked pie.

The pie wash described above is highly satisfactory for most commercial bakeries as it is economical and produces an improved product. By substantially reducing, or entirely omitting, the water or milk, a very rich wash may be made of the whole eggs or the egg whites and corn starch in the proportions set out above. This wash is of course thicker and since there is less volume, etc., it is somewhat more expensive than the wash using the addition liquid. This wash without the liquid is well suited for uncooked pies which are frozen and sold as such. This thick wash covers the pie crust very well and stands up even better for frozen items.

The treatment of the invention whether applied to freshly baked pies or to pies frozen immediately after preparation produces a tender, flaky crust. The washed or coated crusts, which are either top crusts or baked bottom crusts before filling, are of high selling quality due to their appealing appearance.

While the invention has been illustrated by reference to a specific embodiment, there is no intent to limit the spirit and scope of the invention to the precise details so set forth except as defined in the appended claims.

I claim:
1. A method of treating commercial pies which comprises rolling out and shaping upper pie crusts from a mixed and blended dough made of flour and shortening in a ratio of about 12 pounds of flour to about 4 pounds 8 ounces of shortening and with about 8 pounds 8 ounces of water and 4 ounces of salt, and then prior to baking, washing the rolled out and shaped upper crusts with a wash mixture consisting of about one pound of an egg product selected from one of the class of whole eggs and egg whites stiffly beaten with about eight ounces of a liquid selected from one of the class consisting of milk and water and then blending the stiffly beaten mixture with about eight ounces of corn starch, the resulting mixture being beaten until it is thick and forms stiff peaks, whereby to form after baking an integral, tender, crinkly crust.

2. A method according to claim 1 in which the wash is made by whole eggs stiffly beaten with milk.

3. A method according to claim 1 in which the wash is made by stiffly beating the egg product with water.

References Cited in the file of this patent
UNITED STATES PATENTS

| | | |
|---|---|---|
| 2,586,945 | Harrel et al. | Feb. 26, 1952 |
| 2,776,893 | Finucane | Jan. 8, 1957 |

OTHER REFERENCES

"Cassell's Dictionary of Cooking," 1877, Cassell. Pelter, Galpin and Co. (New York), p. 259.

"The Technology of Bread Making," 1921, by Jago. Bukers' Helper Co. (Chicago), p. 325.

"The New Settlement Cook Book," 1954, by Kander. Simon and Schuster (New York), p. 412.